United States Patent
Zhang

(10) Patent No.: US 11,250,269 B2
(45) Date of Patent: Feb. 15, 2022

(54) RECOGNITION METHOD AND APPARATUS FOR FALSE DETECTION OF AN ABANDONED OBJECT AND IMAGE PROCESSING DEVICE

(71) Applicant: Fujitsu Limited, Kawasaki (JP)

(72) Inventor: Nan Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 128 days.

(21) Appl. No.: 16/776,956

(22) Filed: Jan. 30, 2020

(65) Prior Publication Data

US 2020/0334471 A1 Oct. 22, 2020

(30) Foreign Application Priority Data

Apr. 18, 2019 (CN) .......................... 201910311887.9

(51) Int. Cl.
| | | |
|---|---|---|
| G06K 9/00 | (2006.01) | |
| G06K 9/62 | (2006.01) | |
| G06K 9/20 | (2006.01) | |
| G06K 9/48 | (2006.01) | |

(52) U.S. Cl.
CPC ....... *G06K 9/00771* (2013.01); *G06K 9/2054* (2013.01); *G06K 9/48* (2013.01);
(Continued)

(58) Field of Classification Search
CPC .................. G06T 7/194; G06T 7/254; G06T 2207/30232; G06T 7/246; G06T 7/292;
(Continued)

(56) References Cited

U.S. PATENT DOCUMENTS

2009/0309966 A1* 12/2009 Chen .......................... G06T 7/20
348/135
2010/0060732 A1* 3/2010 Tsuji .................... G06K 9/2027
348/143
(Continued)

FOREIGN PATENT DOCUMENTS

| CN | 102902960 A | 1/2013 |
| CN | 104881643 A | 9/2015 |

(Continued)

OTHER PUBLICATIONS

Miguel et al., "Robust unattended and stolen object detection by fusing simple algorithms", Advanced Video and Signal Based Surveillance, 2008, pp. 18-25. (Year: 2008).*
(Continued)

*Primary Examiner* — Kenny A Cese
(74) *Attorney, Agent, or Firm* — Staas & Halsey LLP

(57) ABSTRACT

Embodiments of this disclosure provide a recognition method and apparatus for false detection of an abandoned object and an image processing device. The method includes: performing foreground detection on a current frame image, so as to obtain a foreground image of the current frame image, the foreground image comprising an abandoned object foreground image; clustering contours in the abandoned object foreground image into a group, and take the group as a candidate region of an abandoned object; and comparing the candidate region of the abandoned object with a reference background image, judging whether the candidate region of the abandoned object is matched with the reference background image, and a match, deeming that the abandoned object is false detection.

15 Claims, 4 Drawing Sheets

(52) U.S. Cl.
CPC ........... *G06K 9/6202* (2013.01); *G06K 9/622* (2013.01); *G06K 9/6262* (2013.01)

(58) Field of Classification Search
CPC ..... G06T 7/223; G06T 7/215; G06K 9/00771; G06K 9/2054; G06K 9/48; G06K 9/6202; G06K 9/622; G06K 9/6262
See application file for complete search history.

(56) References Cited

U.S. PATENT DOCUMENTS

2013/0108102 A1\* 5/2013 Brown ............... G06K 9/00369
382/103
2014/0247362 A1 9/2014 Li et al.

FOREIGN PATENT DOCUMENTS

| CN | 105488542 A | 4/2016 |
|---|---|---|
| CN | 106204640 A | 12/2016 |

OTHER PUBLICATIONS

Jun Li et al., "A remains detection algorithm based on machine vision", Journal of Guilin University of Electronic Technology, vol. 36, No., Jun. 2016, pp. 220-225.

Extended European Search Report dated Sep. 24, 2020 in European Patent Application No. 20153100.1.

Connell J et al., "Detection and Tracking in the IBM PeopleVision System", 2004 IEEE International Conference on Multimedia and Expo, Jun. 27-30, 2004, Taipei, Taiwan, IEEE Operations Center, Piscataway, NJ, vol. 2, pp. 1403-1406.

Juan Carlos San Miguel et al., "Robust Unattended and Stolen Object Detection by Fusing Simple Algorithms", IEEE Fifth International Conference on Advanced Video and Signal Based Surveillance, AVSS'08, Piscataway, NJ, USA, Sep. 3, 2008, pp. 18-25.

Lan Jinhui et al., "Real-Time Automatic Obstacle Detection Method for Traffic Surveillance in Urban Traffic" Journal of Signal Processing Systems, Springer, US, vol. 82, No. 3, May 10, 2015, pp. 357-371.

\* cited by examiner (a)    (b)    (c)

RECOGNITION METHOD AND APPARATUS FOR FALSE DETECTION OF AN ABANDONED OBJECT AND IMAGE PROCESSING DEVICE

CROSS-REFERENCE TO RELATED APPLICATIONS

This application is based on and hereby claims priority to Chinese Application No. 201910311887.9, filed Apr. 18, 2019, in the State Intellectual Property Office of China, the disclosure of which is incorporated herein by reference.

FIELD

This disclosure relates to the field of image processing technologies, and in particular to a recognition method and apparatus for false detection of an abandoned object and an image processing device.

BACKGROUND

In the field of video surveillance, abandoned object detection is a basis for applications such as illegal parking detection, falling object detection, and road intrusion detection, etc. Most algorithms for abandoned object detection are based on different background modules. The background modules are updated according to historical information of each pixel. If some pixels are different from the background modules, they will be judged as foregrounds. If the foregrounds remain for a long time, it will be judged as an abandoned region. However, real environmental changes may lead to false detection, especially in some complex scenes. For example, if the light changes continuously, false abandoned object detection may occur.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided a recognition method for false detection of an abandoned object.

The recognition method includes operations where foreground detection is performed on a current frame image, so as to obtain a foreground image of the current frame image, the foreground image including an abandoned object foreground image, contours in the abandoned object foreground image are clustered into a group, and take the group as a candidate region of an abandoned object.

The recognition method includes operations where the candidate region of the abandoned object is compared with a reference background image, whether the candidate region of the abandoned object is matched with the reference background image is judged, and upon a match, the abandoned object is deemed as false detection.

According to an embodiment of this disclosure, there is provided a recognition apparatus for false detection of an abandoned object, wherein the apparatus includes a memory and a processor coupled to the memory.

The processor is configured to perform foreground detection on a current frame image, so as to obtain a foreground image of the current frame image, the foreground image comprising an abandoned object foreground image; cluster contours in the abandoned object foreground image into a group, and take the group as a candidate region of an abandoned object; and compare the candidate region of the abandoned object with a reference background image, judge whether the candidate region of the abandoned object is matched with the reference background image, and upon the candidate region of the abandoned object matching the reference background image, deem that the abandoned object is false detection.

According to an embodiment of this disclosure, there is provided an image processing device, including the recognition apparatus as described in the second aspect.

According to an embodiment of this disclosure, there is provided a computer readable program, which, when executed in a recognition apparatus or an image processing device, will cause the recognition apparatus or the image processing device to carry out the recognition method as described in the first aspect.

According to an embodiment of this disclosure, there is provided a computer readable medium, including a computer readable program, which will cause a recognition apparatus or an image processing device to carry out the recognition method as described in the first aspect.

By way of example, an advantage of the embodiments of this disclosure exists in that the detected candidate region (blob) deemed as the abandoned object is compared with a buffer background (a reference background image), and if they match, it is deemed that the candidate region (blob) is not the abandoned object, and it is judged as false detection. By feeding back a result of judgment to a foreground detecting module and performing corresponding processing by the foreground detecting module, false detection of the abandoned object may be eliminated to some extent.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Various implementations of the embodiments of this disclosure shall be described below with reference to the accompanying drawings. These implementations are illustrative only, and are not intended to limit this disclosure.

It was found by the inventors that in order to solve the above problem, it has been proposed in existing techniques to use classifiers. Most object detection systems may use a classifier to judge whether a detected foreground is a target object or false detection. A good classifier may avoid false detection, but it is not suitable for an abandoned object detection system, as the abandoned object is not limited to a specific type, and may be a box, or a fallen commodity, or some dangerous liquid.

In order to solve as least one of the above problems, embodiments of this disclosure provide a recognition method and apparatus for false detection of an abandoned object and an image processing device, so as to recognize false detection of an abandoned object, eliminate an effect of the false detection of an abandoned object on an object detection system.

Embodiment 1

Figure 1:
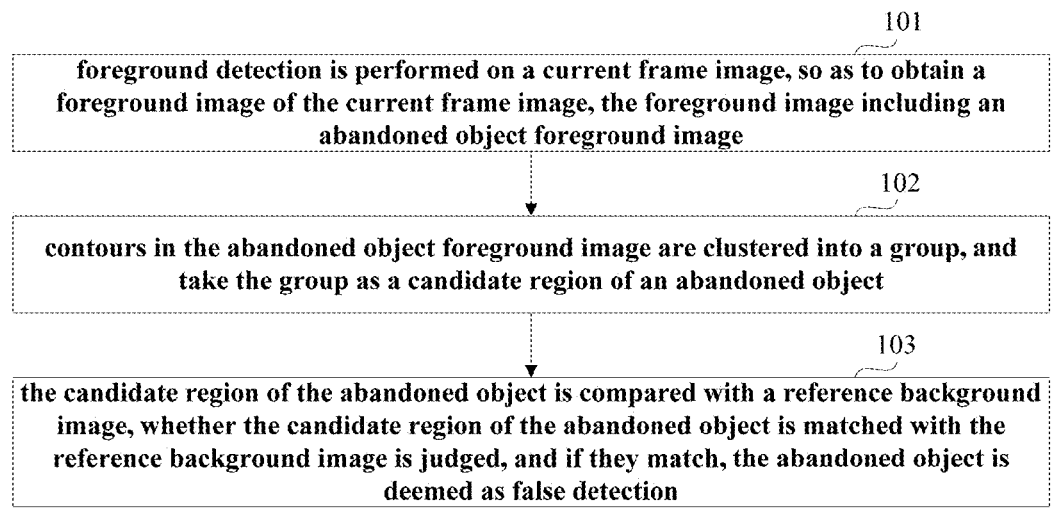
FIG. 1 is a schematic diagram of one implementation of the recognition method for false detection of an abandoned object according to an embodiment.

This embodiment provides a recognition method for false detection of an abandoned object. FIG. 1 is a schematic diagram of one implementation of the recognition method for false detection of an abandoned object of Embodiment 1 of this disclosure. As shown in FIG. 1, the method includes:

operation 101: foreground detection is performed on a current frame image, so as to obtain a foreground image of the current frame image, the foreground image including an abandoned object foreground image;

operation 102: contours in the abandoned object foreground image are clustered into a group, and take the group as a candidate region of an abandoned object; and operation 103: the candidate region of the abandoned object is compared with a reference background image, whether the candidate region of the abandoned object is matched with the reference background image is judged, and if they match, the abandoned object is deemed as false detection.

In this embodiment, the detected candidate region (blob) deemed as the abandoned object is compared with a buffer background (the reference background image) to determine whether they are matched with each other, and if they match, it is deemed that the candidate region (blob) is not the abandoned object, and it is judged as false detection. Hence, whether the abandoned object detection is correct may be recognized, and when the abandoned object detection is false, i.e. false detection is performed on the abandoned object, a result of judgment may be fed back to a foreground detecting module, and the foreground detecting module performs corresponding processing, thereby eliminating false detection of the abandoned object to some extent.

In operation 101 of this embodiment, the current frame image may be a video monitoring image acquired by a video surveillance system. By inputting the current frame image into a foreground detection module, foreground detection may be performed on the current frame image. A foreground detection method is not limited in this embodiment, and any foreground detection methods may be used, such as a Gaussian background model method, a Vibe algorithm, and a frame difference method, etc. By performing foreground detection on the current frame image, a foreground image of the current frame image may be obtained. The foreground image contains a moving foreground and an abandoned foreground, that is, an abandoned object is detected. With the method of this embodiment, whether detection of the abandoned object is correct is recognized.

In operation 102 of this embodiment, with regard to the abandoned foreground, a binary image is used in this embodiment to denote the abandoned foreground, contours in the binary image are found, and the contours are clustered into groups, the groups are taken as candidate regions (blob) of the abandoned object, and each group is taken as a candidate object, that is, a candidate region. A particular clustering method and a method for finding contours in the binary image are not limited in this embodiment, and reference may be made to the related art.

In operation 103 of this embodiment, the candidate region of the abandoned object is compared with the reference background image to judge whether the candidate region of the abandoned object is matched with the reference background image, and if they match, it shows that the abandoned object is not a real abandoned object but is a background, that is, the detection of the abandoned object is false detection.

In this embodiment, the reference background image may be obtained from the image obtained by the video surveillance system. For example, the video surveillance system may obtain each frame of the image. When there exists no object in a frame of image, its grayscale image is taken as a reference background image, which may also be referred to as a buffer background. A method for detecting object on each frame image is not limited in this embodiment, and any existing methods may be employed to determine whether there exists a object on the current frame image.

In this embodiment, the reference background image may be updated according to the occupancy of the above foreground image detected from the current frame image. The occupancy of the foreground image here is a ratio of the foreground image to a region of interest (ROI) in the current frame image.

Figure 2:
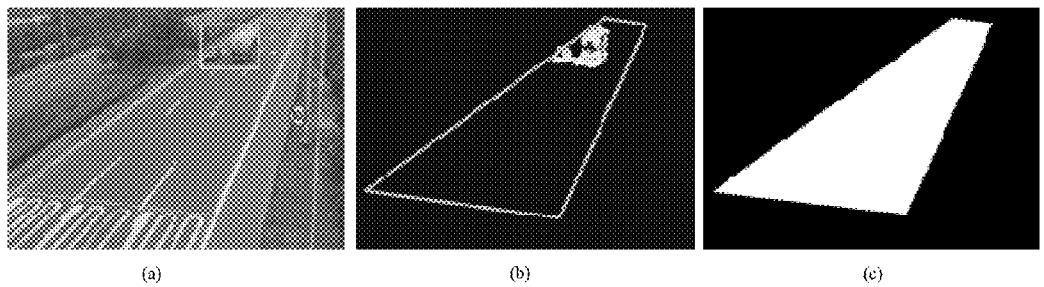
FIG. 2 is a schematic diagram of an input image, foreground mask and ROI mask of a frame image.

In one implementation of this embodiment, an occupancy of each row in an ROI may be calculated first, and then an average occupancy is taken as the occupancy of the foreground image of the current frame image. FIG. 2 is a schematic diagram of an input image (a), a foreground mask (b) and an ROI mask (c) of a frame image. As shown in FIG. 2, the occupancy of the foreground image may be obtained through calculation by using the formula as below:

$$occ = \sum_{y=y_u}^{y_d} \frac{N_y}{L_y(y_d - y_u)};$$

in this formula, Ny is the number of pixels in a y-th row of foreground pixels, $N_y = \Sigma_{I_y:fgmask(I_y)\neq 0} 1$, Ly is the number of pixels in a y-th row of ROI, $L_y = \Sigma_{I_y:roimask(I_y)\neq 0} 1$, Iy is pixels in the y-th row, fgmask is the foreground mask, which contains a moving foreground and an abandoned foreground, roimask is the ROI mask, and y, $y_u$, and $y_d$ denote rows.

The above formula for calculating the occupancy of the foreground image is illustrative only. According to the implementation principle of this embodiment and the formula, other formulae may also be derived, for example, $$occ = \frac{\sum_{y=y_u}^{y_d} \frac{N_y}{L_y}}{(y_d - y_u)}.$$

In another implementation of this embodiment, the number of foreground pixels of the entire ROI may also be divided by the number of pixels of the entire ROI, and the quotient may be taken as the occupancy of the foreground image, a formula being as follows:

$$occ = \frac{\sum_{y=y_u}^{y_d} N_y}{(y_d - y_u)\sum_{y=y_u}^{y_d} L_y}.$$

The above implementations are examples only, and this embodiment is not limited to these three formulae.

In this embodiment, if the occupancy (occ) of the foreground image is less than a predetermined first threshold, it is deemed that there exists no abandoned object in the current frame image, and the current frame image is updated as a reference background image; and if the occupancy of the foreground image is not less than the predetermined first threshold, it is deemed that there exists an abandoned object in the current frame image, and the reference background image is not updated. A manner and basis for setting the first threshold are not limited in this embodiment, which may be set empirically, or may be set with reference to an environment. As the reference background image is used for matching of the abandoned object, the first threshold may be set as being a relatively small value. That is, when the occ is very low (less than the first threshold), it means that there exists no motion or abandoned object, and the grayscale image of the current frame will be updated as a reference background image. In one implementation, the first threshold may be set to be 0.03.

Figure 3:
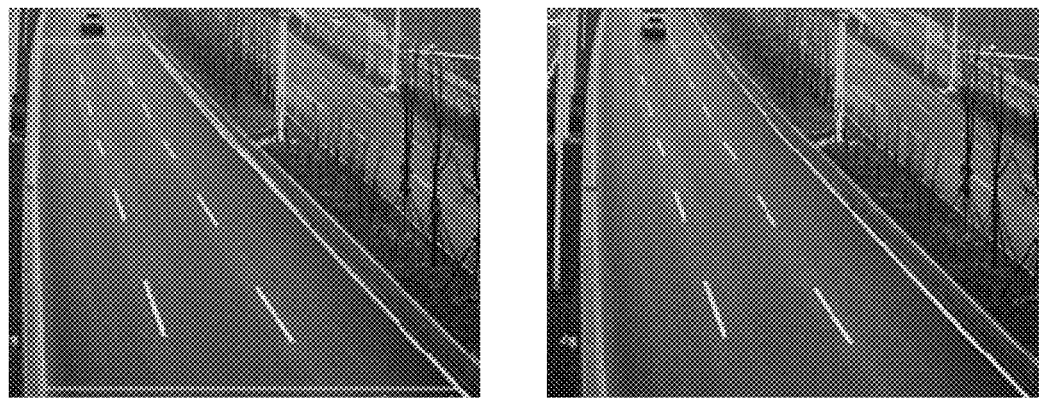
FIG. 3 is a schematic diagram of updating a reference background image.

FIG. 3 is a schematic diagram of updating the reference background image. As shown in FIG. 3, in this example, the occupancy of the foreground image is 0, which is lower than 0.03, that is, before a vehicle enters into the ROI, there exists no object in the ROI, as shown on the left. At this moment of time, the reference background image may be updated into the grayscale image to which the current frame image corresponds, as shown on the right.

Figure 4:
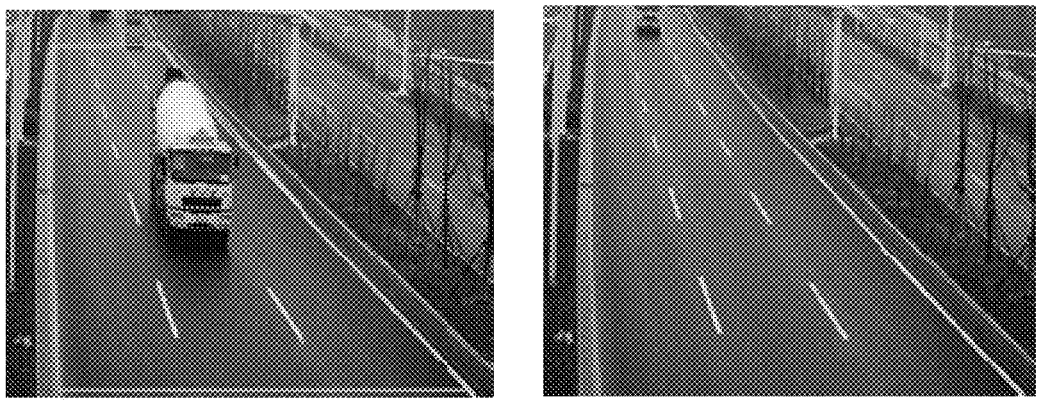
FIG. 4 is a schematic diagram of not updating a reference background image.

FIG. 4 is a schematic diagram of not updating the reference background image. As shown in FIG. 4, in this example, the occupancy of the foreground image is 0.21, which is higher than 0.03, that is, the vehicle has entered into the ROI, and a new object exists in the ROI, as shown on the left. At this moment of time, the reference background image is not updated, and the grayscale image before the arrival of the vehicle is still used as the reference background image, as shown on the right.

In the above description, the grayscale image being taken as the reference background image is taken as an example. However, this embodiment is not limited thereto, and other forms of images of the current frame image may also be taken as the reference background image, as long as they may be used for being compared with the candidate region of the abandoned object.

In operation 103 of this embodiment, each candidate region of the abandoned object may be compared with the reference background image. If the candidate region matches with the reference background image, detection of the abandoned object is deemed as being false detection, that is, the abandoned object is not a real abandoned object, for example, it may be a background.

Figure 5:
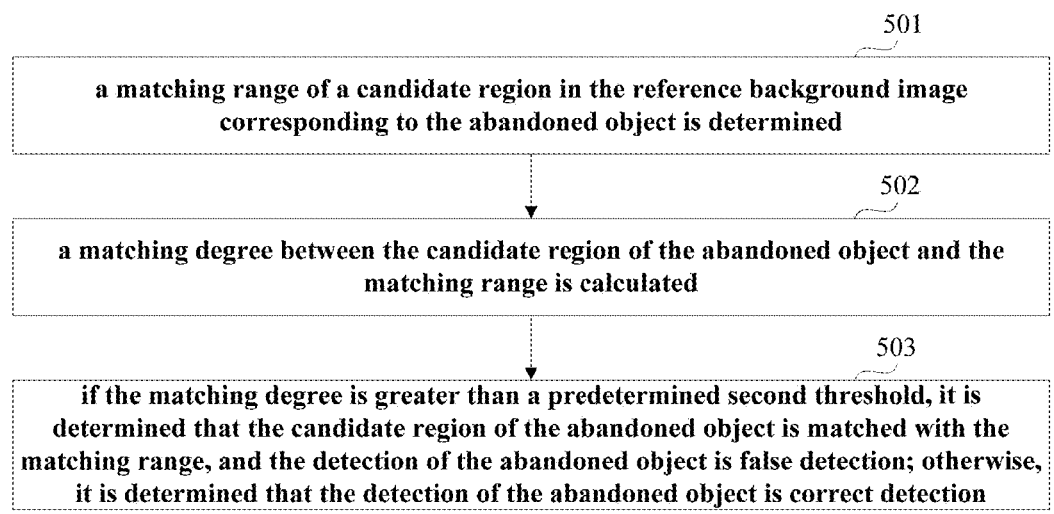
FIG. 5 is a schematic diagram of judging whether the candidate region of the abandoned object is matched with the reference background image in the method shown in FIG. 1.

FIG. 5 is a schematic diagram of one implementation of operation 103 in this embodiment. As shown in FIG. 5, the method includes:

operation 501: a matching range of a candidate region in the reference background image corresponding to the abandoned object is determined;

operation 502: a matching degree between the candidate region of the abandoned object and the matching range is calculated; and operation 503: if the matching degree is greater than a predetermined second threshold, it is determined that the candidate region of the abandoned object is matched with the matching range, and the detection of the abandoned object is false detection; otherwise, it is determined that the detection of the abandoned object is correct detection.

In operation 501 of this implementation, the matching range in the reference background image may be determined according to a size of the candidate region of the abandoned object. For example, a size of the candidate blob is taken as a size of a window, and a matching function is used to slide in the reference background image to find a corresponding matching range. And the size of the above matching range may be larger than the size of the candidate region of the abandoned object, because a camera of the video surveillance system may possibly shift from the reference background image to the current frame image, and by setting a matching range larger than the size of the candidate region of the abandoned object, effect of movement of the camera may be reduced. In this implementation, the matching range may be a predetermined multiple of the candidate region, such as 0.2 times. However, this embodiment is not limited thereto, and the predetermined multiple may also be empirically set to be other values.

Figure 6:
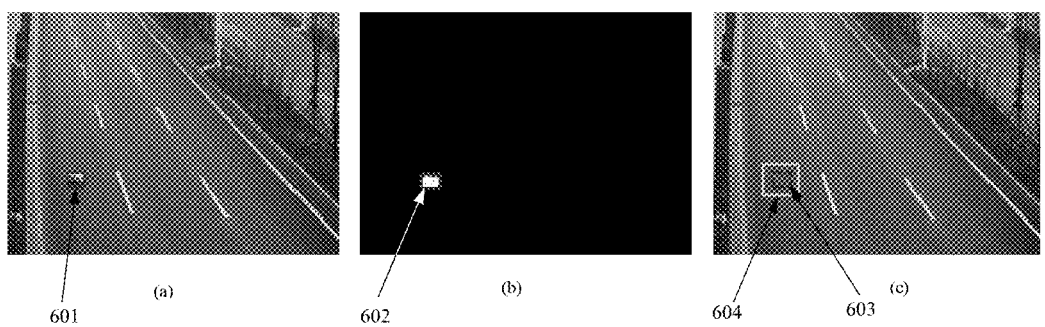
FIG. 6 is a schematic diagram of abandoned object detection.

FIG. 6 is a schematic diagram of the abandoned object detection, in which FIG. 6 (*a*) shows the current frame image, on which the abandoned object 601 is detected, FIG. 6 (*b*) shows an abandoned foreground image 602, FIG. 6 (*c*) shows a candidate region 603 of the abandoned foreground image 602 and a matching range 604 in the reference background image.

In operation 502 of this implementation, after obtaining the candidate region of the abandoned object and the matching range in the corresponding reference background image, the matching degree between the two may be calculated. A calculation method of the matching degree is not limited in this embodiment, which shall be described below by way of an example.

In this example, it is assumed that the matching range is W×H and the candidate region is w×h.

First, a grayscale image of each candidate region is taken as a template, a matching function is used to slide in the reference background image of W×H, overlap patches of w×h are compared, and a comparison result is saved in a matrix (mat), and the size of mat is: (W−w+1)×(H−h+1).

Then, a normalized correlation coefficient method is used to perform template matching, as shown in a formula as below; wherein, I denotes an original image (the reference background image in the matching range), T is a template image (the grayscale image in the candidate region), and R is a matching result, that is, the matching degree.

$$T'(x', y') = \frac{T(x', y') - \frac{1}{w \times h}\sum_{x'',y''} T(x'', y'')}{\sqrt{\sum_{x',y'} T(x', y')^2}},$$

-continued
$$I'(x+x', y+y') = \frac{I(x+x', y+y') - \frac{1}{w \times h}\sum_{x'',y''} I(x+x'', y+y'')}{\sqrt{\sum_{x',y'} I(x', y')^2}},$$

$$R(x, y) = \sum_{x',y'} (T'(x', y') \cdot I'(x+x', y+y'))$$

$(x \in [0, W-w], y \in [0, H-h], x' \in [0, w-1],$ $y' \in [0, h-1], x'' \in [0, w-1], y'' \in [0, h-1]);$ where, T (x', y') denotes a pixel value of a position (x', y') of a template image, I(x+x", y+y") denotes a pixel value of a position (x+x", y+y") of the template image, T'(x', y') is a normalized correlation coefficient of the template image at the position (x', y'), I'(x+x', y+y') is a normalized correlation coefficient of the original image at the position (x+x', y+y'), and R (x, y) denotes a matching result of the position (x,y).

In this embodiment, before calculating a similarity (matching degree) between the original image I and the template image T, normalization processing may be performed, and this operation may avoid errors caused by illumination changes. A result matrix R value is within a range of −1 to 1; where, 1 denotes that the original image I is identical to the template image T, −1 denotes that the original image I is opposite to the template image T, and 0 denotes that there exists no linear relationship between the original image I and the template image T.

In this implementation, a best matching position of the template image T in the original image I may be found by searching a maximum value in the result matrix R. For example, as a matching degree in the matching range calculated by taking a pixel position (x, y) as a starting point is stored in each pixel position (x, y) in the result matrix R, a pixel position with a highest matching degree in the result matrix R is the best matching position in the corresponding matching range.

The above method for calculating the matching degree is illustrative only, and any existing method for calculating the matching degree may be applicable to this disclosure.

In operation 503 of this implementation, a matching threshold (referred to as a second threshold) is set, and when the matching degree is greater than the matching threshold, the two are deemed as being matched, that is, the abandoned object is not a real abandoned object, and may be a background, and current abandoned object detection is false detection. On the contrary, when the matching degree is less than the matching threshold, the two are deemed as being not matched, that is, the abandoned object is possibly a real abandoned object, and current abandoned object detection is correct.

Taking the above method for calculating the matching degree as an example, the maximum value in the calculation result of the matching degree may be taken as the final matching degree (match_degree), the higher the match_degree, the higher the matching degree between the original image I and the template image T, and the above second threshold may be used to distinguish between a real abandoned object and false detection. That is, if match_degree is greater than the second threshold, the candidate region of the abandoned object is matched with the reference background image, and it is judged as false detection.

In this embodiment, a method and basis for setting the second threshold are not limited. Since the second threshold is used to judge whether the candidate region is matched with the matching range, the second threshold may be set as demanded. For example, when the requirement of the matching accuracy is high, it may be set to be of a relatively large value, and when the requirement of the matching accuracy is not high, it may be set to be of a relatively small value. In one implementation, the second threshold may be set to be 0.8.

In the example in FIG. 6, the matching degree is 0.1093, which is less than 0.8, and it is deemed that the original image I and the template image T are not matched, in which case according to the method of this embodiment, it is not judged as false detection, that is, the abandoned object 601 in FIG. 6 is a real abandoned object.

Figure 7:
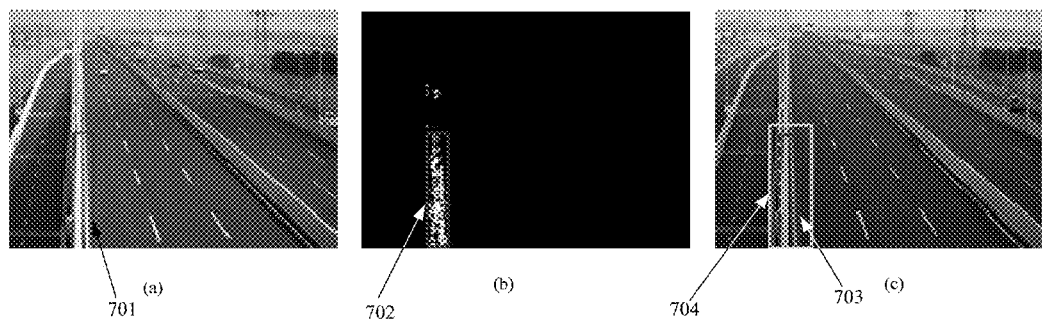
FIG. 7 is another schematic diagram of abandoned object detection.

FIG. 7 is another schematic diagram of the abandoned object detection, in which FIG. 7 (a) shows the current frame image, in which the abandoned object 701 is detected, FIG. 7 (b) shows an abandoned foreground image 702, FIG. 7 (c) shows a candidate region 703 of the abandoned foreground image 702 and a matching range 704 in the reference background image.

As shown in FIG. 7, in this example, the matching degree is 0.969, which is greater than 0.8, meaning that the original image I is matched with the template image T, in this case according to the method of this embodiment, it is judged as being false detection, that is, the abandoned object 701 in FIG. 7 is not a real abandoned object, but a part of a background. Such false detection may be caused by illumination changes, or may be caused due to other reasons.

After the judgment result of the false detection is obtained by the method of this embodiment, information on the false detection may be fed back to a foreground detection module, and a background model may be adjusted, so that false detection of the abandoned object may be eliminated to some extent. A processing manner of the foreground detection module after receiving the information is not limited in this embodiment, and it may perform any feasible processing according to the information, and a manner of adjusting the background model is not limited in this embodiment.

In this embodiment, the detected candidate region (blob) deemed as the abandoned object is compared with a buffer background (a reference background image), and if they match, it is deemed that the candidate region (blob) is not the abandoned object, and it is judged as false detection. By feeding back a result of judgment to a foreground detecting module and performing corresponding processing by the foreground detecting module, false detection of the abandoned object may be eliminated to some extent.

Embodiment 2

Embodiment 2 provides a recognition apparatus for false detection of an abandoned object. As principles of the apparatus for solving problems are similar to that of the method in Embodiment 1, reference may be made to the implementation of the method in Embodiment 1 for implementation of the apparatus, with identical contents being not going to be described herein any further.

Figure 8:
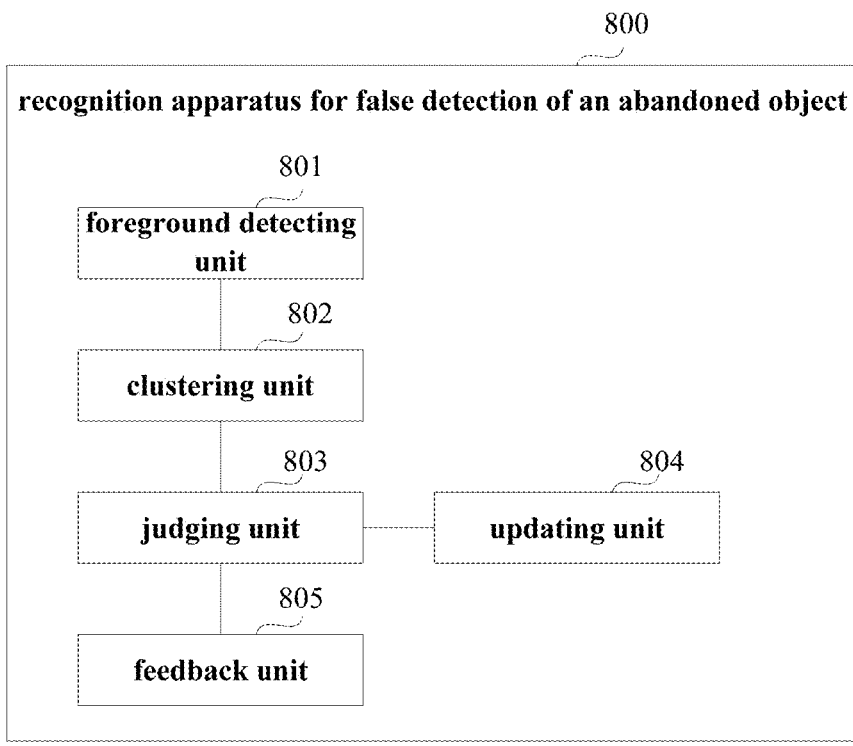
FIG. 8 is a schematic diagram of the recognition apparatus for false detection of an abandoned object according to an embodiment.

FIG. 8 is a schematic diagram of the recognition apparatus 800 for false detection of an abandoned object of this embodiment. As shown in FIG. 8, the recognition apparatus 800 for false detection of an abandoned object includes a foreground detecting unit 801, a clustering unit 802 and a judging unit 803; wherein the foreground detecting unit 801 is configured to perform foreground detection on a current frame image, so as to obtain a foreground image of the current frame image, the foreground image including an abandoned object foreground image, the clustering unit 802 is configured to cluster contours in the abandoned object foreground image into a group, and take the group as a candidate region of an abandoned object, and the judging unit 803 is configured to compare the candidate region of the abandoned object with a reference background image, judge whether the candidate region of the abandoned object is matched with the reference background image, and if they match, deem that the abandoned object is false detection.

In this embodiment, the current frame image may be a video monitoring image; however, this embodiment is not limited thereto.

In this embodiment, as shown in FIG. 8, the recognition apparatus 800 for false detection of an abandoned object may further include:

an updating unit 804, configured to update the reference background image according to an occupancy of the foreground image, the occupancy of the foreground image being a ratio of the foreground image to a region of interest (ROI) in the current frame image.

In this embodiment, when the occupancy of the foreground image is less than a predetermined first threshold, the updating unit 804 may deem that there exists no abandoned object in the current frame image, and update the current frame image into a reference background image;

and when the occupancy of the foreground image is not less than the predetermined first threshold, the updating unit 804 may deem that there exists an abandoned object in the current frame image, and does not update the reference background image.

In one implementation, the updating unit 804 may calculate the occupancy of the foreground image by using the following formula:

$$occ = \sum_{y=y_u}^{y_d} \frac{N_y}{L_y(y_d - y_u)};$$

where, $N_y$ is the number of pixels of a y-th row of foreground pixel, $N_y = \Sigma_{I_y:fgmask(I_y) \neq 0} 1$, $L_y$ is the number of pixels of a y-th row of ROI $L_y = \Sigma_{I_y:roimask(I_y) \neq 0} 1$, Iy is pixels in the y-th row, fgmask is a foreground mask, and roimask is a ROI mask.

Figure 9:
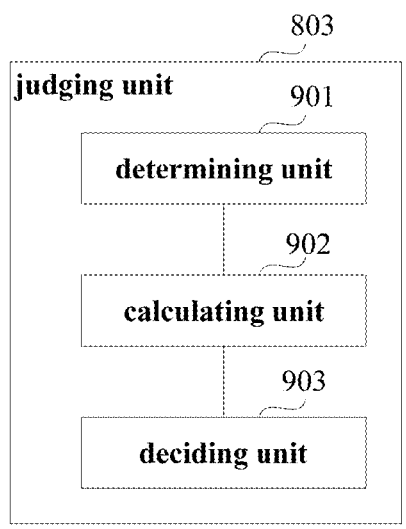
FIG. 9 is a schematic diagram of the judging unit in the recognition apparatus for false detection of an abandoned object according to an embodiment.

FIG. 9 is a schematic diagram of one implementation of the judging unit 803 of this embodiment. As shown in FIG. 9, the judging unit 803 may include a determining unit 901, a calculating unit 902 and a deciding unit 903; wherein the determining unit 901 may determine a matching range of a candidate region in the reference background image corresponding to the abandoned object, the calculating unit 902 may calculate a matching degree between the candidate region of the abandoned object and the matching range, and the deciding unit 903 may, when the matching degree is greater than a predetermined second threshold, determine that the candidate region of the abandoned object is matched with the matching range, and the abandoned object is false detection; otherwise, determine that the abandoned object is correct detection.

In this implementation, a size of the matching range may be larger than a size of the candidate region of the abandoned object.

In this implementation, as shown in FIG. 8, the recognition apparatus 800 for false detection of an abandoned object may further include:

a feedback unit 805, configured to feed back information on the false detection to a foreground detecting module, and adjust a background model.

In this embodiment, the detected candidate region (blob) deemed as the abandoned object is compared with a buffer background (a reference background image), and if they match, it is deemed that the candidate region (blob) is not the abandoned object, and it is judged as false detection. By feeding back a result of judgment to a foreground detecting module and performing corresponding processing by the foreground detecting module, false detection of the abandoned object may be eliminated to some extent.

Embodiment 3

This embodiment provides an image processing device, including the recognition apparatus for false detection of an abandoned object as described in Embodiment 2.

Figure 10:
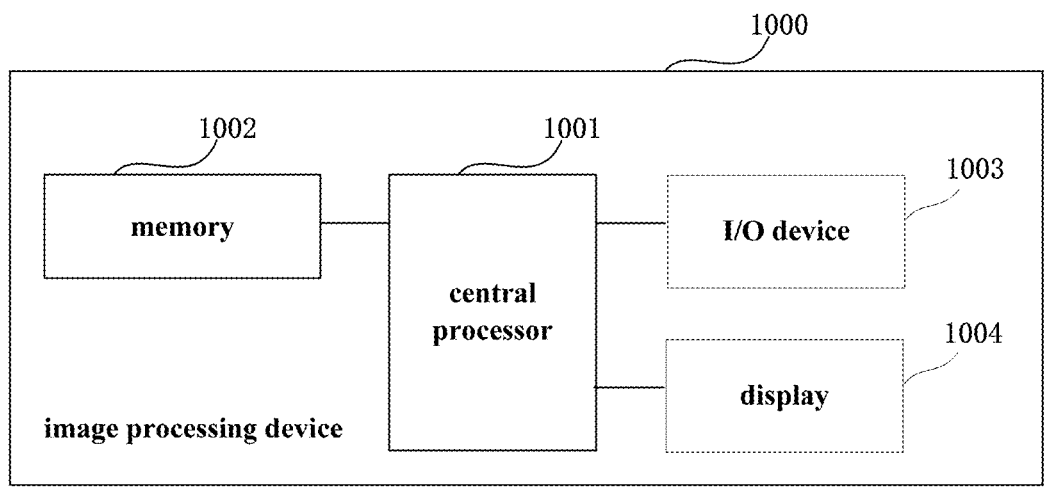
FIG. 10 is a schematic diagram of the image processing device according to an embodiment.

FIG. 10 is a schematic diagram of the image processing device of this embodiment. As shown in FIG. 10, the image processing device 1000 may include a central processor 1001 (CPU) and a memory 1002, the memory 1002 being coupled to the central processor 1001. The memory 1002 may store various data, and furthermore, it may store a program for data processing, and execute the program under control of the central processor 1001.

In one implementation, the functions of the recognition apparatus 800 for false detection of an abandoned object may be integrated into the central processor 1001, wherein the central processor 1001 may be configured to carry out the recognition method for false detection of an abandoned object described in Embodiment 1.

In another implementation, the recognition apparatus 800 for false detection of an abandoned object and the central processor 1001 may be configured separately; for example, the recognition apparatus 800 for false detection of an abandoned object may be configured as a chip connected to the central processor 1001, and the functions of the recognition apparatus 800 for false detection of an abandoned object are executed under control of the central processor 1001.

In this embodiment, the central processor 1001 may be configured to perform the following control: performing foreground detection on a current frame image, so as to obtain a foreground image of the current frame image, the foreground image including an abandoned object foreground image; clustering contours in the abandoned object foreground image into a group, and take the group as a candidate region of an abandoned object; and comparing the candidate region of the abandoned object with a reference background image, judging whether the candidate region of the abandoned object is matched with the reference background image, and if they match, deeming that the abandoned object is false detection.

Furthermore, as shown in FIG. 10, the image processing device 1000 may include an input/out (I/O) device 1003, and a display 1004, etc.; wherein functions of the above components are similar to those in the related art, which shall not be described herein any further. It should be noted that the image processing device 1000 does not necessarily include all the parts shown in FIG. 10, and furthermore, the image processing device 1000 may include parts not shown in FIG. 10, and the related art may be referred to.

An embodiment of this disclosure provides a computer readable program, which, when executed in a recognition apparatus for false detection of an abandoned object or a image processing device, will cause the recognition apparatus for false detection of an abandoned object or the image processing device to carry out the method described in Embodiment 1.

An embodiment of the present disclosure provides a computer readable medium, including a computer readable program, which will cause a recognition apparatus for false detection of an abandoned object or an image processing device to carry out the method described in Embodiment 1.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or operations as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 8 (such as the foreground detecting unit, the clustering unit, and the judging unit, etc.) may either correspond to software modules of procedures of a computer program, or correspond to hardware modules. Such software modules may respectively correspond to the operations shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A recognition apparatus for false detection, comprising:
a memory; and
a processor coupled to the memory and configured to:
perform foreground detection on a current frame image, so as to obtain a foreground image of the current frame image, the foreground image including an abandoned object foreground image,
cluster contours in the abandoned object foreground image into a group, and take the group as a candidate region of an abandoned object, and
compare the candidate region of the abandoned object with a reference background image, and judge whether the candidate region of the abandoned object matches with the reference background image, wherein the abandoned object is deemed a false detection upon the candidate region of the abandoned object matching the reference background image,
wherein the judging by the processor comprises:
determining a matching range of a candidate region in the reference background image corresponding to the abandoned object,
calculating a matching degree between the candidate region of the abandoned object and the matching range, determining, when the matching degree is greater than a threshold, the candidate region of the abandoned object is matched with the matching range, and the abandoned object is false detection, and
determining, when the matching degree is less than the threshold, the abandoned object is correct detection.

2. The recognition apparatus according to claim 1, wherein the current frame image is a video monitoring image.

3. The recognition apparatus according to claim 1, wherein the processor is configured to:
update the reference background image according to an occupancy of the foreground image, the occupancy of the foreground image being a ratio of the foreground image to a region of interest in the current frame image.

4. The recognition apparatus according to claim 3, wherein when the occupancy of the foreground image is less than a threshold, the processor deems no abandoned object exists in the current frame image, and updates the current frame image into the reference background image, and
when the occupancy of the foreground image is greater than or equal to the threshold, the processor deems the abandoned object exists in the current frame image, and does not update the reference background image.

5. The recognition apparatus according to claim 3, wherein the processor calculates the occupancy of the foreground image by using the following formula:

$$occ = \sum_{y=y_u}^{y_d} \frac{N_y}{L_y(y_d - y_u)};$$

where, Ny is a number of pixels of a y-th row of foreground pixel, $N_y = \Sigma_{I_y: fgmask(I_y) \neq 0} 1$, Ly is a number of pixels of a y-th row of region of interest, $L_y = \Sigma_{I_y: roimask(I_y) \neq 0} 1$, Iy is pixels in the y-th row, fgmask is a foreground mask, and roimask is a region of interest mask.

6. The recognition apparatus according to claim 1, wherein a size of the matching range is larger than a size of the candidate region of the abandoned object.

7. The recognition apparatus according to claim 1, wherein the processor is further configured to:
feed back information on the false detection, and adjust a background model.

8. An image processing device, comprising:
a memory that stores a plurality of instructions; and
a processor coupled to the memory and configured to execute the plurality of instructions to:
perform foreground detection on a current frame image, so as to obtain a foreground image of the current frame image, the foreground image including an abandoned object foreground image;
cluster contours in the abandoned object foreground image into a group, and take the group as a candidate region of an abandoned object; and
compare the candidate region of the abandoned object with a reference background image, and judge whether the candidate region of the abandoned object matches with the reference background image, wherein the abandoned object is deemed a false detection upon the candidate region of the abandoned object matching the reference background image,
wherein the judging by the processor comprises:
determining a matching range of a candidate region in the reference background image corresponding to the abandoned object,
calculating a matching degree between the candidate region of the abandoned object and the matching range, determining, when the matching degree is greater than a threshold, the candidate region of the abandoned object is matched with the matching range, and the abandoned object is false detection, and
determining, when the matching degree is less than the threshold, the abandoned object is correct detection.

9. A recognition method for false detection, wherein the method comprises:
performing foreground detection on a current frame image, so as to obtain a foreground image of the current frame image, the foreground image including an abandoned object foreground image;
clustering contours in the abandoned object foreground image into a group, and take the group as a candidate region of an abandoned object; and
comparing the candidate region of the abandoned object with a reference background image, and judging whether the candidate region of the abandoned object matches with the reference background image, wherein the abandoned object is deemed a false detection upon the candidate region of the abandoned object matching the reference background image,
wherein the method further comprises:
determining a matching range of a candidate region in the reference background image corresponding to the abandoned object,
calculating a matching degree between the candidate region of the abandoned object and the matching range,
determining, when the matching degree is greater than a threshold, the candidate region of the abandoned object is matched with the matching range, and the abandoned object is false detection, and determining, when the matching degree is less than the threshold, the abandoned object is correct detection.

10. The recognition method according to claim 9, wherein a size of the matching range is larger than a size of the candidate region of the abandoned object.

11. The recognition method according to claim 9, wherein the method further comprises:
    feeding back information on the false detection, and adjusting a background model.

12. The recognition method according to claim 9, wherein the current frame image is a video monitoring image.

13. The recognition method according to claim 9, wherein the method further comprises:
    updating the reference background image according to an occupancy of the foreground image, the occupancy of the foreground image being a ratio of the foreground image to a region of interest in the current frame image.

14. The recognition method according to claim 13, wherein,
    when the occupancy of the foreground image is less than a threshold, determining no abandoned object exists in the current frame image, and updating the current frame image into the reference background image, and
    when the occupancy of the foreground image is greater than or equal to the threshold, determining the abandoned object exists in the current frame image where the reference background image is not updated.

15. The recognition method according to claim 13, wherein the method comprises: calculating the occupancy of the foreground image by using the following formula:

$$occ = \sum_{y=y_u}^{y_d} \frac{N_y}{L_y(y_d - y_u)};$$

where, Ny is a number of pixels of a y-th row of foreground pixel, $N_y = \Sum_{I_y; fgmask(I_y) \neq 0} 1$, Ly is a number of pixels of a y-th row of region of interest, $L_y = \Sum_{I_y; roimask(I_y) \neq 0} 1$, Iy is pixels in the y-th row, fgmask is a foreground mask, and roimask is a region of interest mask.

* * * * *